United States Patent
Borghini-Lilli et al.

(10) Patent No.: US 9,434,463 B2
(45) Date of Patent: Sep. 6, 2016

(54) STRUCTURAL COMPONENT

(71) Applicant: Airbus Operations GmbH, Hamburg (DE)

(72) Inventors: Matteo Borghini-Lilli, Hamburg (DE); Marc'Antonio Bentivoglio, Hamburg (DE); Henrik-Bro Henriksen, Hamburg (DE); Ruslan Zagreba, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 278 days.

(21) Appl. No.: 14/021,198

(22) Filed: Sep. 9, 2013

(65) Prior Publication Data

US 2014/0072769 A1  Mar. 13, 2014

Related U.S. Application Data

(60) Provisional application No. 61/697,861, filed on Sep. 7, 2012.

(30) Foreign Application Priority Data

Sep. 7, 2012  (EP) .................................. 12183538

(51) Int. Cl.
  *B64C 1/12* (2006.01)
  *B64C 3/26* (2006.01)
  *B64C 1/06* (2006.01)

(52) U.S. Cl.
  CPC ................. *B64C 1/12* (2013.01); *B64C 1/064* (2013.01); *B64C 3/26* (2013.01); *B64C 1/06* (2013.01); *B64C 1/069* (2013.01); *Y02T 50/42* (2013.01); *Y10T 428/24* (2015.01); *Y10T 428/24562* (2015.01)

(58) Field of Classification Search
  CPC .............................................. B64C 2001/0054
  USPC ....................................................... 244/159.1
  See application file for complete search history.

(56) References Cited

U.S. PATENT DOCUMENTS

| | | | |
|---|---|---|---|
| 2009/0146008 A1 | 6/2009 | Thiele | |
| 2010/0044514 A1* | 2/2010 | Tacke | 244/131 |
| 2011/0042519 A1* | 2/2011 | Tacke et al. | 244/131 |
| 2011/0164918 A1 | 7/2011 | Cosentino | |
| 2012/0100343 A1* | 4/2012 | Borghini-Lilli et al. | 428/156 |
| 2012/0104170 A1* | 5/2012 | Gallant et al. | 244/132 |
| 2012/0234978 A1* | 9/2012 | Hernando Navas et al. | 244/132 |

FOREIGN PATENT DOCUMENTS

| | | |
|---|---|---|
| WO | 2009109438 | 9/2009 |
| WO | 2010046684 | 4/2010 |

OTHER PUBLICATIONS

European Search Report, Jan. 11, 2013.

* cited by examiner

*Primary Examiner* — David Sample
*Assistant Examiner* — Donald M Flores, Jr.
(74) *Attorney, Agent, or Firm* — Greer, Burns & Crain Ltd.

(57) ABSTRACT

A structural component, in particular for an aircraft, having a skin and at least one stiffening element for stiffening the skin. Opposite to a run-out of the stiffening element at least one supporting element is positioned. The at least one supporting element defines a supporting area that is opened to the stiffening element run-out in longitudinal direction of the stiffening element run-out and that is closed in transversal direction of the stiffening element run-out.

10 Claims, 2 Drawing Sheets

STRUCTURAL COMPONENT

CROSS-REFERENCES TO RELATED APPLICATIONS

This application claims the benefit of the U.S. Provisional Application No. 61/697,861, filed on Sep. 7, 2012, and of the European patent application No. 12 183 538.3 filed on Sep. 7, 2012, the entire disclosures of which are incorporated herein by way of reference.

BACKGROUND OF THE INVENTION

The invention concerns a structural component, in particular for an aircraft.

Such a structural component is exemplary shown in FIG. 1. The known structure component 1, for example an upper cover of an aircraft wing, has a skin 2 and a multiplicity of longitudinal stiffening elements 4 and transversal stiffening elements 6 building a grid-like or mesh-like stiffening structure 8 for stiffening the skin 2. Due to configuration reasons, outer meshes 10a of the stiffening structure can be significantly enlarged in comparison with inner meshes 10b.

In order to avoid any buckling of the skin 2 in one of the enlarged meshes 10a, opposite to a run-out of a longitudinal stiffening element 12 extending in an enlarged mesh 10a one longitudinal supporting element 14 is positioned and aligned with the run-out of a stiffening element 12. The longitudinal stiffening element 12 is a so-called panel breaker and reduces a buckling risk of the skin 2 in the supported enlarged mesh 10b.

SUMMARY OF THE INVENTION

The object of the invention is the creating of an alternative structural component, which shows a high resistance to buckling.

This object is achieved by means of the structural component disclosed.

An inventive structural component, in particular for an aircraft, has a skin and at least one stiffening element for stiffening the skin. Opposite to a run-out of the stiffening element a supporting element is positioned. In accordance with the invention the at least one supporting element defines a supporting area that is opened to the stiffening element run-out in longitudinal direction of the stiffening element run-out and that is closed in transversal direction of the stiffening element run-out.

Due to the at least one supporting element, which is called in the following a panel breaker, the former unsupported skin area in front of the stiffening run-out shows a high resistance to buckling. Thereby, the at least one panel breaker avoids a strain increase in the high-loaded skin area in front of the stiffening element run-out as it does not change the neutral axis of this skin area. That means, although the at least one panel breaker significantly reduces the risk of buckling, it does not bring additional stiffness to the skin area in front of the stiffening element run-out. In order to avoid a weight increase of the structural component, the at least one panel breaker can be made from composite materials such as CFRP (carbon fibers reinforced plastic) or GFRP (glass fibers reinforced plastic) or from light weight metallic materials such as titanium or aluminum. Thereby, the at least one panel breaker can be flexible adapted to different skin topologies such that the skin topology is not limited by the at least one supporting element. For instance, the at least one panel breaker can have such a shape that it can be positioned in ramp areas of the skin.

Advantageously, the at least one panel breaker is in a longitudinal distance from the stiffening element run-out. Hereby, the stiffness in the front of the stiffening element run-out is significantly reduced.

In one embodiment, the at least one panel breaker has two lateral longitudinal limbs that are joined with each other at their rear ends. Thus, just one panel breaker is necessary to establish the supporting area, which in this embodiment is limited in longitudinal direction at its distal end seen from the stiffening element run-out. As just one panel breaker is necessary, it is easy to install. Preferably, the limbs have the same shape. For instance, the limbs have cross sections such as T-profiles, I-profiles, E-profiles or Omega-profiles.

In another embodiment, at least two single longitudinal panel breakers are provided for establishing the supporting area that are spaced from each other in transversal direction. Thus, the supporting area is preferably opened at its longitudinal distal end seen from the stiffening element run-out. Of course, the at least two panel breakers can also be joined at their distal ends and thus forming a supporting are that is closed at its distal end in longitudinal direction. As at least two panel breakers are necessary, the installation of the supporting area is more complicated than in the aforementioned embodiment. However, the manufacturing of two single longitudinal panel breakers is easier than the manufacturing of a panel breaker having two joined limbs. Preferably, the panel breakers have the same shape. For example, they are formed as longitudinal T-profiles, I-profiles, E-profiles or Omega-profiles.

In both embodiments the supporting area is preferably shortened in transversal direction away from the stiffening element run-out. Due to the reduced space between the limbs or the at least two single panel breakers in longitudinal direction away from the stiffening element run-out, the supporting area is V-shaped or almost V-shaped.

In order to achieve such a V-shaped supporting area, the two limbs or the at least two single panel breakers are inclined to each other in the longitudinal direction. Of course, the supporting area can have shapes different from a V-shape, such as a semicircle.

Preferably, the two limbs or the two single panel breakers have flanges for joining them to the skin, wherein the flanges at their opposite inner front portions are stepped back in transversal direction relative to their adjusted flange portions. Due to the modified front portions, the supporting area is additionally widened at its front end facing the stiffening element run-out. Hereby, the stiffness in the front of the stiffening element run-out is additionally reduced.

Other advantageous examples of the embodiment of the invention are the subject of further subsidiary claims.

BRIEF DESCRIPTION OF THE DRAWINGS

Preferred exemplary embodiments of the invention are described in greater detail below with reference to highly simplified schematic drawings. In these drawings.

DETAILED DESCRIPTION OF THE PREFERRED EMBODIMENTS

Figure 1:
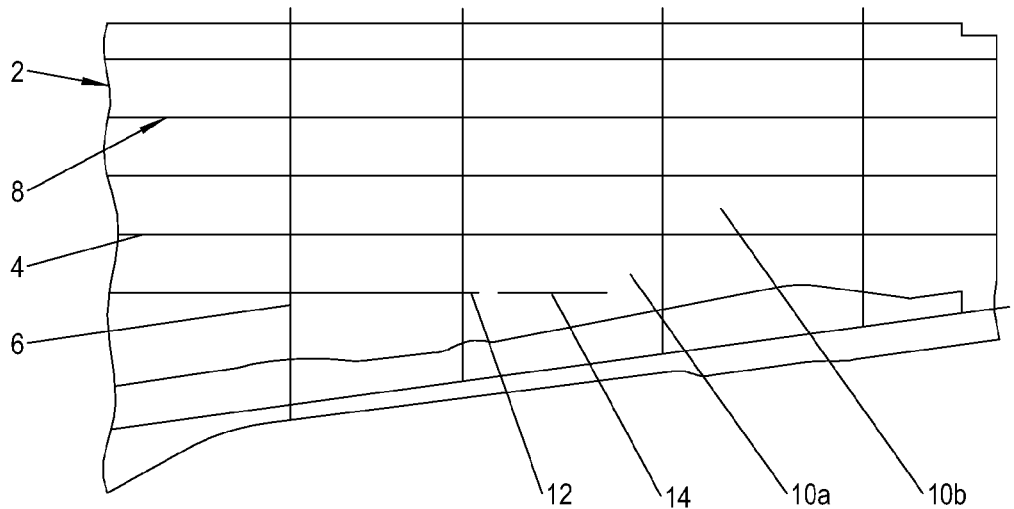
FIG. 1 shows a plan view of a known structural component.
Figure 2:
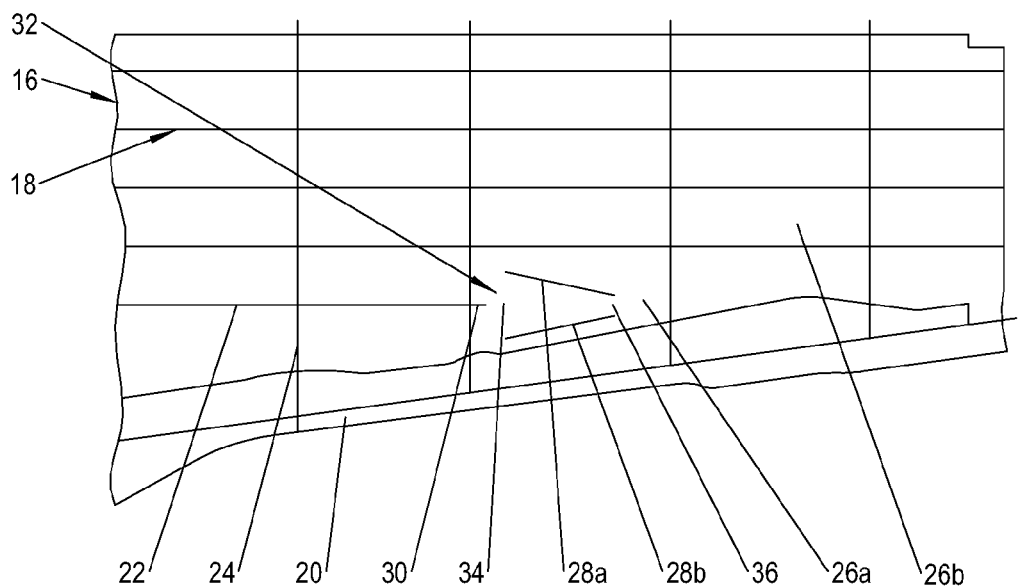
FIG. 2 shows a plan view of a first embodiment of the structural component according to the invention.

As shown in FIG. 2, a structural component 15 according to the invention has a skin 16 and a mesh-like stiffening structure 18 for stiffening the skin 16. In the shown first embodiment, the structural component 15 is an upper wing cover of an aircraft. However, the structural component 15 can also be a fuselage skin panel or can refer to other mainly two dimensional structural areas.

The skin 16 has a short extension in flight direction (wing depth or transversal direction) and a large extension orthogonally to the flight direction (wing span or longitudinal direction). Due to aerodynamical reasons, its rear edge 20 is inclined in longitudinal direction. Preferably, the skin 16 is made from composite materials such as CFRP and GRP, comprising reinforcement fibers which are embedded in a matrix made from thermosetting plastic or thermoplastic. However, the skin 16 can also be made from light metallic materials such as an aluminum alloy.

The mesh-like stiffening structure 18 comprises a plurality of longitudinal stiffening elements 22 and transversal stiffening elements 24. In the shown embodiment, the longitudinal stiffening elements 22 are so-called stringers that extend in longitudinal direction of the skin 16. The transversal stiffening elements 24 are so-called ribs that extend in cross direction of skin 16.

Preferably, the stiffening elements 22, 24 are made from composite materials such as CFRP and GRP, comprising reinforcement fibers which are embedded in a matrix made from thermosetting plastic or thermoplastic. However, they can also be made from light weight metallic materials based on aluminum or titanium, for instance.

The mesh-like stiffening structure 18 forms a lot of meshes 26a, 26b that divide the skin 16 into unsupported skin areas. Mainly, the meshes 26a, 26b have the same size, whereby due to configuration reasons, the meshes 26a close to the rear edge 20 of the skin 16 can be enlarged in comparison with the inner meshes 26b away from the rear edge 26.

In order to avoid buckling in the enlarged meshes 26a, in the first embodiment two supporting elements 28a, 28b are positioned in the enlarged mesh 26a. The supporting elements 28a, 28b build so-called panel breakers and positioned in such a way opposite to a run-out of the stringer element 30 extending in the enlarged mesh 26a that a supporting area 32 is created which is opened to the stringer run-out 30 in longitudinal direction of the stringer run-out 30 and that is closed in transversal direction of the stringer run-out 30. In particular, the supporting area 32 is mainly closed in transversal direction of the stringer run-out 30. "Mainly closed" means that a distance between front ends of the supporting elements 28a, 28b near the stringer run-out 30 is greater than a distance between rear ends of the supporting elements 28a, 28b being far from the stringer run-out 30. In the shown embodiment, the longitudinal direction of the stringer run-out 30 is the longitudinal direction of the stringer 22 itself and the transversal direction of the stringer run-out 30 is the transversal direction of the stringer 22 itself.

The panel breakers 28a, 28b are in a longitudinal distance from the stringer run-out 30 and spaced apart and evenly inclined to each other in longitudinal direction of the stringer run-out 32 in such a way that the supporting area 32 is shortened in transversal direction away from the stringer run-out 30. Thus, the supporting area 32 has a V-shape with a wide opening 34 close to the stringer run-out 30 and a shortened distal end 36 away from the stringer run-out 30.

Figure 3:
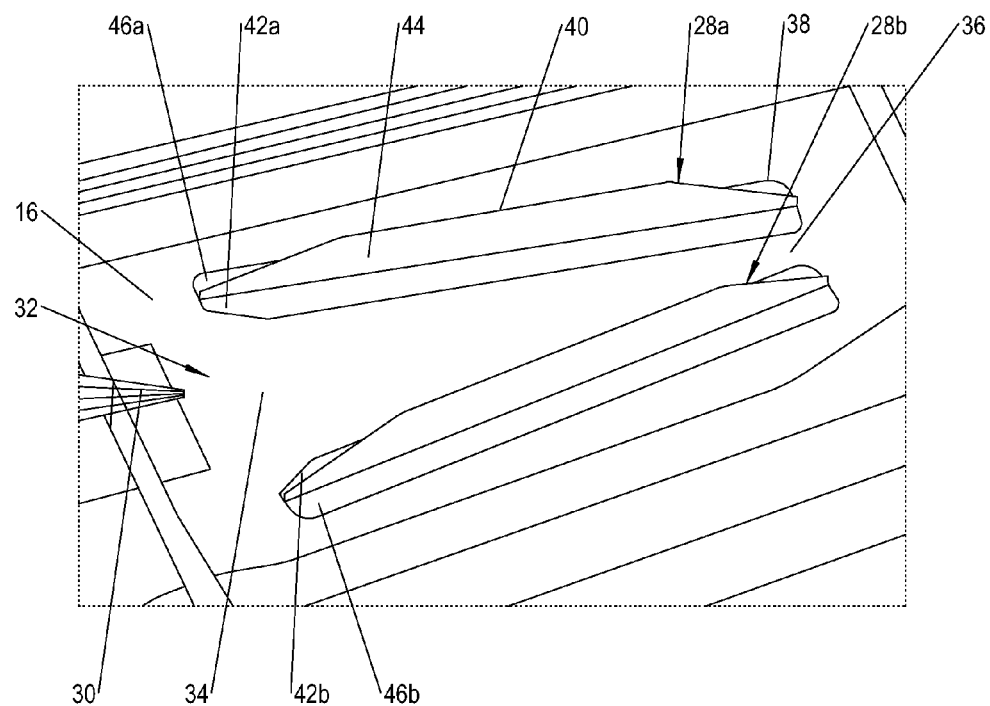
FIG. 3 shows a perspective view of two supporting elements of the first embodiment.

As shown in FIG. 3, the panel breakers 28a, 28b can each have a T-shape with a flange 38 for connecting them with the skin 16 and with a stabilizing web 40 that extends vertically from the flange 38. The panel breakers 28a, 28b are connected to the skin 16 by a plurality of not shown fasteners such as bolts or rivets. The fasteners are aligned in a row and extend through holes in the flange 38 and the skin 16. Preferably, the fasteners are set on both sides of the web 40.

In order to avoid a stiffness increase of the skin 16 directly in front of the stringer run-out 30 due to the fasteners, inner front flange portions 42a, 42b are stepped back to their adjacent inner flange portions 44. Due to this, the inner length of the flanges 38 is shortened in longitudinal direction in comparison with the length over outer flange portion 46a, 46b. As a consequence, the inner fasteners are arranged at a greater distance to the stringer run-out 30 and thus to the high loaded transition area in front of the stringer run-out 30 than the outer fasteners. Due to the reduced inner length of the flanges 38, the flanges 38 obtain a reduced number of fasteners at their inner portions compared to their outer portions. Further on, due to the back stepping of the inner front flange portions 42a, 42b, the opening 34 of the supporting area 32 is additionally opened, thereby the stiffness in the front of the stringer run-out 30 is additionally reduced. Alternatively, the panel breakers 28a, 28b are bonded to the skin 22.

Figure 4:
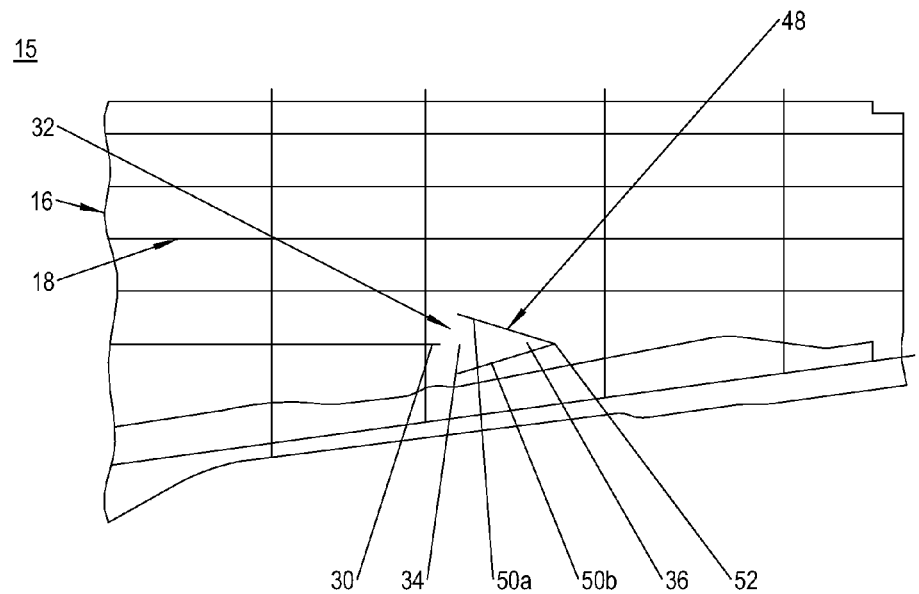
FIG. 4 shows a plan view of a second embodiment of the structural component according to the invention.

In FIG. 4 a second embodiment of the structural component 15 is shown which has a skin 16 stiffened by a stiffening structure 18.

Contrary to the first embodiment shown in FIGS. 2 and 3, the second embodiment consists of only one single panel breaker 48 for supporting a former unsupported skin area in front of a high loaded area such as a stringer run-out 30.

The panel breaker 48 is in a longitudinal distance from the stringer run-out 30. It has two lateral limbs 50a, 50b that are inclined in longitudinal direction of the stringer run-out 30 and that are joined together at their rear ends 52 away from the stringer run-out 30. Due to this, the supporting area 32 is V-shaped, whereby in contrast to the first embodiment, the supporting area 32 is closed at its distal end 36 in longitudinal direction of the stringer run-out 30. Thus, the supporting area 32 is only opened at its front end 34 close to the stringer run-out 30 in longitudinal direction.

The limbs 50a, 50b can have the same cross sections as the two panel breakers 28a, 28b of the first embodiment and can also be made from composite materials or from metallic materials. They can also have inner front portions that are stepped back compared to adjacent inner flange portions. Further on, the limbs 50a, 50b can be bolted by fasteners or bonded to the skin 16.

Disclosed is a structure component, in particular for an aircraft, having a skin and at least one stiffening element for stiffening the skin, wherein opposite to a run-out of the stiffening element at least one supporting element is positioned, wherein the at least one supporting element defines a supporting area that is opened to the stiffening element run-out in longitudinal direction of the stiffening element run-out and that is closed in transversal direction of the stiffening element run-out.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE SYMBOL LIST 1 structural component
2 skin
4 longitudinal stiffening element
6 transversal stiffening element
8 stiffening structure
10a, b mesh
12 run-out of a stiffening element
14 supporting element (panel breaker)
15 structural component
16 skin
18 stiffening structure
20 rear edge
22 longitudinal stiffening element
24 transversal stiffening element
26a, b mesh
28a, b supporting element
30 stringer run-out
32 supporting area
34 opening
36 distal end
38 flange
40 web
42a, b inner front flange portion
44 adjacent inner front flange portion
46a outer flange portion
48 supporting element
50a, b limb
52 rear end

The invention claimed is:

1. A structural component, having a skin and at least one stiffening element extending in a longitudinal direction and engaging the skin for stiffening the skin, wherein the stiffening element terminates at a run-out at an unsupported skin area which extends longitudinally beyond the stiffening element, and in the unsupported skin area a supporting area is created, the supporting area being defined by generally longitudinally extending supporting elements engaging the skin, comprising:
a transversal distance between front ends of the supporting elements closest to the stiffening element run-out being greater than a transversal distance between rear ends of the supporting elements furthest from the stiffening element run-out, such that the supporting area defined by the supporting elements is widened at its front end facing the stiffening element run-out, wherein the supporting elements are spaced a longitudinal distance from the stiffening element run-out.

2. The structural component in accordance with claim 1, wherein at least one supporting element has two lateral generally longitudinally extending limbs that are joined with each other at their rear ends.

3. The structural component in accordance with claim 2, wherein a transversal space between the supporting elements is reduced in the longitudinal direction extending away from the stiffening element run-out such that the supporting area transversally narrows in the longitudinal direction away from the stiffening element run-out.

4. The structural component in accordance with claim 3, wherein the two limbs have outer flanges at each limb extending transversally away from the other of the two limbs along the longitudinal length of the two limbs and inner flanges at each limb extending transversally towards the other of the two limbs along the longitudinal length of the two limbs for joining the two limbs to the skin, wherein the inner flanges at their front portions are stepped back in the transversal direction relative to the outer flange portions.

5. The structural component in accordance with claim 1, wherein at least two single generally longitudinal supporting elements are provided that are spaced from each other in the transversal direction.

6. The structural component in accordance with claim 5, wherein a transversal space between the supporting elements is reduced in the longitudinal direction extending away from the stiffening element run-out such that the supporting area transversely narrows in the longitudinal direction away from the stiffening element run-out.

7. The structural component in accordance with claim 5, wherein the two longitudinal supporting elements have outer flanges at each element extending transversally away from the other of the two elements and inner flanges at each element extending transversally towards the other of the two elements for joining the elements to the skin, wherein the flanges at their opposite inner front portions are stepped back in transversal direction relative to their adjacent flange portions.

8. The structural component in accordance with claim 1, wherein the structural component is a component of an aircraft.

9. A structural component, having a skin and at least one stiffening element extending in a longitudinal direction and engaging the skin for stiffening the skin, wherein the stiffening element terminates at a run-out at an unsupported skin area which extends longitudinally beyond the stiffening element, and in the unsupported skin area a supporting area is created, the supporting area being defined by generally longitudinally extending supporting elements engaging the skin, comprising:
a transversal distance between front ends of the supporting elements closest to the stiffening element run-out being greater than a transversal distance between rear ends of the supporting elements furthest from the stiffening element run-out, such that the supporting area defined by the supporting elements is widened at its front end facing the stiffening element run-out, wherein at least one supporting element has two lateral generally longitudinally extending limbs that are joined with each other at their rear ends, wherein a transversal space between the supporting elements is reduced in the longitudinal direction extending away from the stiffening element run-out such that the supporting area transversally narrows in the longitudinal direction away from the stiffening element run-out, and wherein the two limbs are angled toward each other in the longitudinal direction.

10. A structural component, having a skin and at least one stiffening element extending in a longitudinal direction and engaging the skin for stiffening the skin, wherein the stiffening element terminates at a run-out at an unsupported skin area which extends longitudinally beyond the stiffening element, and in the unsupported skin area a supporting area is created, the supporting area being defined by generally longitudinally extending supporting elements engaging the skin, comprising:
a transversal distance between front ends of the supporting elements closest to the stiffening element run-out being greater than a transversal distance between rear ends of the supporting elements furthest from the stiffening element run-out, such that the supporting area defined by the supporting elements is widened at its front end facing the stiffening element run-out, wherein at least two single generally longitudinal supporting elements are provided that are spaced from each other in the transversal direction, wherein a transversal space between the supporting elements is reduced in the longitudinal direction extending away from the stiffening element run-out such that the supporting area transversely narrows in the longitudinal direction away from the stiffening element run-out, and wherein the two single generally longitudinal supporting elements are angled towards each other in the longitudinal direction.

* * * * *